United States Patent
Goncalves et al.

(10) Patent No.: US 12,541,589 B1
(45) Date of Patent: Feb. 3, 2026

(54) METHOD AND APPARATUS FOR SNAPSHOT MANAGEMENT

(71) Applicant: Dell Products L.P., Round Rock, TX (US)

(72) Inventors: David Goncalves, Acushnet, MA (US); Evan Jones, Glenville, NY (US)

(73) Assignee: Dell Products L.P., Round Rock, TX (US)

( * ) Notice: Subject to any disclaimer, the term of this patent is extended or adjusted under 35 U.S.C. 154(b) by 10 days.

(21) Appl. No.: 18/794,264

(22) Filed: Aug. 5, 2024

(51) Int. Cl.
 *G06F 21/55* (2013.01)
 *G06F 16/27* (2019.01)

(52) U.S. Cl.
 CPC .......... *G06F 21/554* (2013.01); *G06F 16/273* (2019.01)

(58) Field of Classification Search
 CPC .............................. G06F 21/554; G06F 16/273
 See application file for complete search history.

(56) References Cited

U.S. PATENT DOCUMENTS

| | | | |
|---|---|---|---|
| 11,061,603 B1 * | 7/2021 | Bankar | G06F 3/0614 |
| 11,068,191 B2 * | 7/2021 | Chen | G06F 3/0611 |
| 11,231,857 B2 * | 1/2022 | Xia | G06F 3/0619 |
| 11,734,306 B2 * | 8/2023 | Chen | G06F 3/061 |
| | | | 707/613 |
| 12,086,036 B1 * | 9/2024 | Yoder | G06F 11/2097 |
| 12,210,763 B1 * | 1/2025 | Taylor | G06F 3/067 |
| 2020/0326866 A1 * | 10/2020 | Catalano | G06F 3/0634 |
| 2022/0083564 A1 * | 3/2022 | Bora | G06F 12/0802 |
| 2022/0245172 A1 * | 8/2022 | Thomas | G06F 16/273 |
| 2025/0086072 A1 * | 3/2025 | Shetty | G06F 11/2094 |
| 2025/0165167 A1 * | 5/2025 | Vijan | G06F 3/0604 |

* cited by examiner

*Primary Examiner* — Stephen T Gundry
(74) *Attorney, Agent, or Firm* — Daly, Crowley, Mofford & Durkee, LLP.

(57) ABSTRACT

A method for use in a storage system including a primary storage system and a secondary storage system, the method comprising: starting an asynchronous replication manager; detecting that an intrusion detector has detected an intrusion in the primary storage system; in response to the intrusion being detected, causing the asynchronous replication manager to stop transmission, to a secondary storage system, of replication data associated with any data buckets that are collected by the asynchronous replication manager while allowing the asynchronous replication manager to continue collecting new data buckets; generating an alert that indicates that the intrusion detector has detected the intrusion; receiving a response that is indicative of whether the intrusion is confirmed; when the response indicates that the intrusion is not confirmed, resuming the asynchronous replication manager, and when the intrusion is confirmed, causing the asynchronous replication manager to stop collecting data buckets.

20 Claims, 5 Drawing Sheets

METHOD AND APPARATUS FOR SNAPSHOT MANAGEMENT

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided for use in a storage system including a primary storage system and a secondary storage system, the method comprising: starting an asynchronous replication manager, the asynchronous replication manager being configured to replicate data from the primary storage system to the secondary storage system at predetermined time intervals, wherein replicating the data includes collecting a data bucket for each of the predetermined time intervals and transmitting replication data associated with each data bucket from the primary storage system to the secondary storage system; detecting that an intrusion detector has detected an intrusion in the primary storage system; in response to the intrusion being detected, causing the asynchronous replication manager to stop transmission, to the secondary storage system, of replication data associated with any data buckets that are collected by the asynchronous replication manager while allowing the asynchronous replication manager to continue collecting new data buckets; generating an alert that indicates that the intrusion detector has detected the intrusion; receiving a response that is indicative of whether the intrusion is confirmed; when the response indicates that the intrusion is not confirmed, resuming the asynchronous replication manager, wherein resuming the asynchronous replication manager includes causing the asynchronous replication manager to resume the transmission of replication data that is associated with any data buckets that are collected by the asynchronous replication manager; and when the response indicates that the intrusion is confirmed, causing the asynchronous replication manager to stop collecting data buckets.

According to aspects of the disclosure, a system is provided, comprising: a memory; and a processor that is operatively coupled to the memory, the processor being configured to perform the operations of: starting an asynchronous replication manager, the asynchronous replication manager being configured to replicate data from a primary storage system to a secondary storage system at predetermined time intervals, wherein replicating the data includes collecting a data bucket for each of the predetermined time intervals and transmitting replication data associated with each data bucket from the primary storage system to the secondary storage system; detecting that an intrusion detector has detected an intrusion in the primary storage system; in response to the intrusion being detected, causing the asynchronous replication manager to stop transmission, to the secondary storage system, of replication data associated with any data buckets that are collected by the asynchronous replication manager while allowing the asynchronous replication manager to continue collecting new data buckets; generating an alert that indicates that the intrusion detector has detected the intrusion; receiving a response that is indicative of whether the intrusion is confirmed; when the response indicates that the intrusion is not confirmed, resuming the asynchronous replication manager, wherein resuming the asynchronous replication manager includes causing the asynchronous replication manager to resume the transmission of replication data that is associated with any data buckets that are collected by the asynchronous replication manager; and when the response indicates that the intrusion is confirmed, causing the asynchronous replication manager to stop collecting data buckets.

According to aspects of the disclosure, a non-transitory computer-readable medium storing one or more processor-executable instructions which, when executed by at least one processor of a primary storage system, causes the at least one processor to perform the operations of: starting an asynchronous replication manager, the asynchronous replication manager being configured to replicate data from the primary storage system to a secondary storage system at predetermined time intervals, wherein replicating the data includes collecting a data bucket for each of the predetermined time intervals and transmitting replication data associated with each data bucket from the primary storage system to the secondary storage system; detecting that an intrusion detector has detected an intrusion in the primary storage system; in response to the intrusion being detected, causing the asynchronous replication manager to stop transmission, to the secondary storage system, of replication data associated with any data buckets that are collected by the asynchronous replication manager while allowing the asynchronous replication manager to continue collecting new data buckets; generating an alert that indicates that the intrusion detector has detected the intrusion; receiving a response that is indicative of whether the intrusion is confirmed; when the response indicates that the intrusion is not confirmed, resuming the asynchronous replication manager, wherein resuming the asynchronous replication manager includes causing the asynchronous replication manager to resume the transmission of replication data that is associated with any data buckets that are collected by the asynchronous replication manager; and when the response indicates that the intrusion is confirmed, causing the asynchronous replication manager to stop collecting data buckets.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
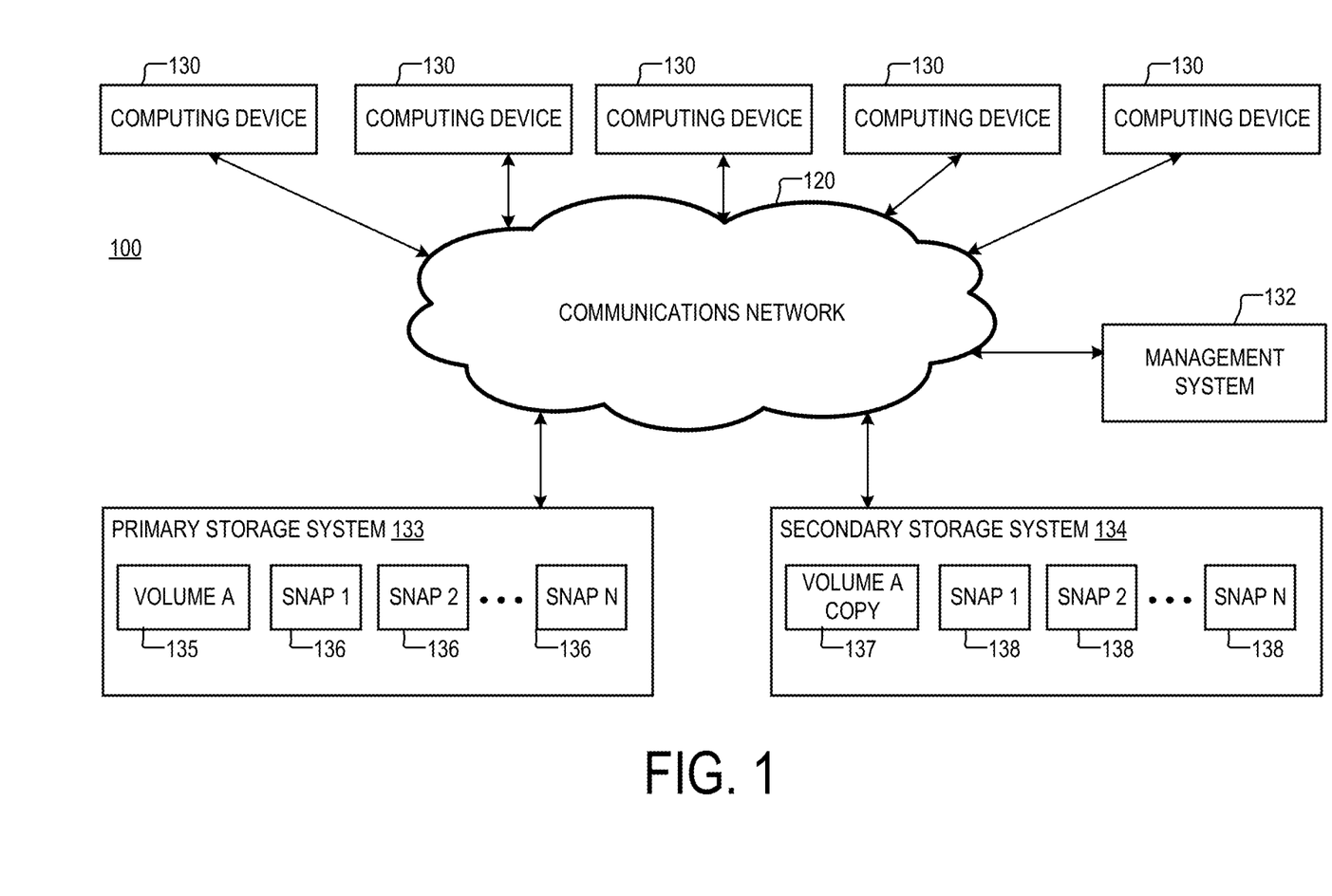
FIG. 1 is a diagram of an example of a system, according to aspects of the disclosure.

FIG. 1 is a diagram of an example of a system 100, according to aspects of the disclosure. As illustrated, system 100 may include a primary storage system 133 and a secondary storage system 134 that is coupled to a plurality of computing devices 130 and a management system 132 via communications network 120. Each of the primary storage system 133 and the secondary storage system 134 may be the same or similar to the storage system 200, which is discussed further below with respect to FIG. 2. Each of the computing devices 130 may include a smartphone, a desktop, a laptop, and/or any other device that might be used by a user to store and retrieve data from the primary storage system 133. The communications network 120 may include one or more of the Internet, a local area network (LAN), a wide area network (WAN), an InfiniBand network, a mobile data network, etc. Management system 132 may include a computing system that is used by a system administrator to manage and configure storage systems 133 and 134.

The primary storage system 133 may be configured to implement a volume 135. In addition, the primary storage system 133 may be configured to create snapshots 136 of volume 135 at predetermined time intervals. The secondary storage system 134 may be configured to store a copy 137 of volume 135. In addition, the secondary storage system 134 may be configured to store snapshots 138 of volume copy 137. Copy 137 of volume 135 may be a volume itself, and it may be an image of volume 135. According to the present example, copy 137 is created and/or updated by using asynchronous replication. According to the present example, the asynchronous replication is performed and/or otherwise coordinated by an asynchronous replication manager 316 (shown in FIGS. 3 and 4B). According to the present example, the asynchronous replication manager 316 is executed on management system 132. However, in alternative implementations, the asynchronous replication manager 316 may be executed on another computing device. Stated succinctly, the asynchronous replication manager 316 may be executed on any suitable type of computing device.

Figure 2:
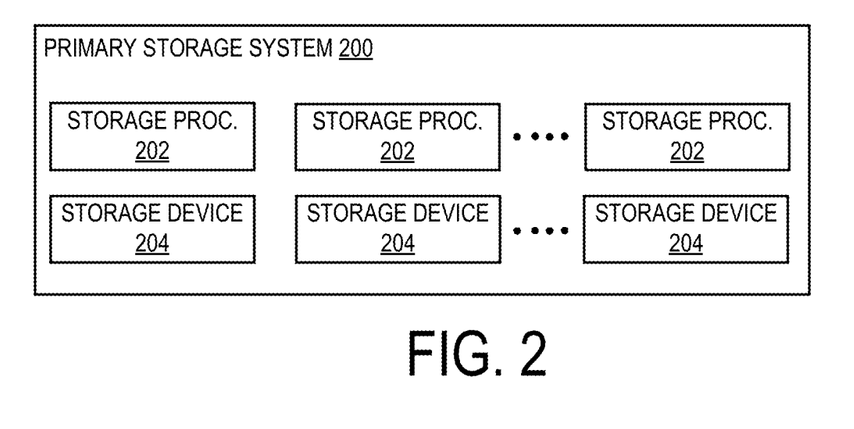
FIG. 2 is a diagram of an example of a storage system, according to aspects of the disclosure.

FIG. 2 is a diagram of an example of a storage system 200, according to aspects of the disclosure. The storage system 200 may include any suitable type of storage system, such as the Dell PowerMax™ storage system. As such, the storage system 200 may include a plurality of storage processors 202 and a plurality of storage devices 204 In some implementations, each of the storage devices 204 may include a Solid-State Drive (SSD), a Non-Volatile Memory Express (NVME) device, a hard disk, and/or any other suitable type of storage device. In some implementations, each of the storage processors 202 may include a computing device, such as the computing device 600, which is discussed further below with respect to FIG. 6. Each of the storage processors may be configured to receive I/O requests from the computing devices 130 and fulfill those requests by reading or writing data to the storage devices 204.

Figure 3:
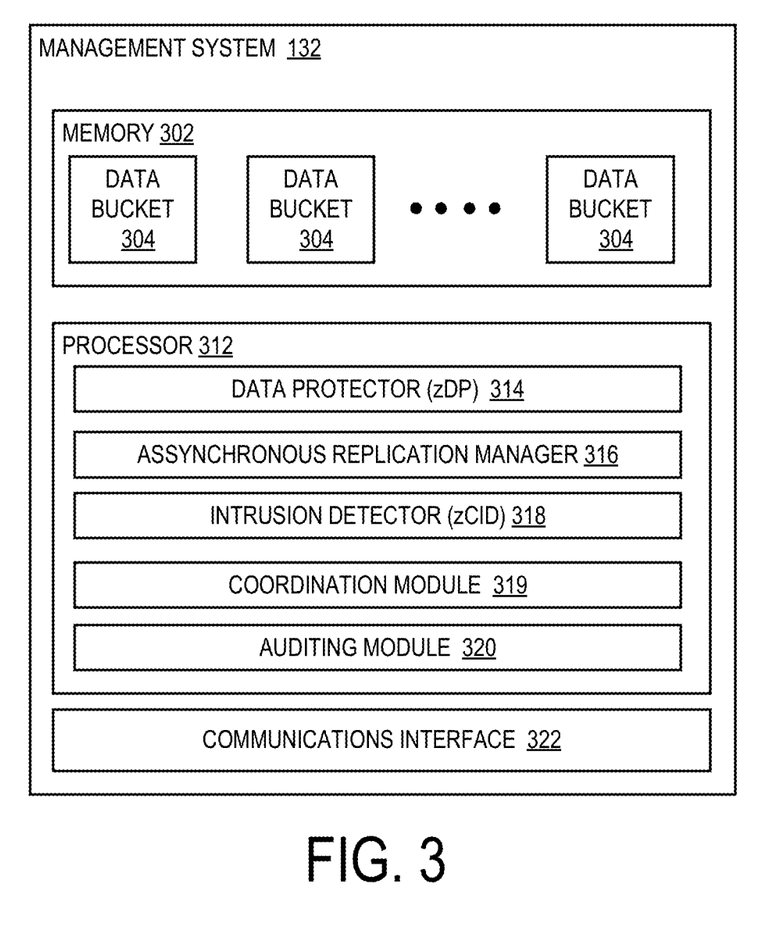
FIG. 3 is a diagram of an example of an array management system, according to aspects of the disclosure.

FIG. 3 is a diagram of the management system 132, according to aspects of the disclosure. As illustrated, the management system 132 may include a memory 302, a processor 312, and a communications interface 322. Memory 302 may include any suitable type of volatile or non-volatile memory, such as a solid-state drive (SSD), a hard disk (HD), a random-access memory (RAM), a Synchronous Dynamic Random-Access Memory (SDRAM), etc. Processor 312 may include any suitable type of processing circuitry, such as one or more of a general-purpose process (e.g., an x86 processor, a MIPS processor, an ARM processor, etc.), a special-purpose processor, an application-specific integrated circuit (ASIC), a field programmable gate array (FPGA), etc. The communications interface 322 may include any suitable type of communications interface. By way of example, the communications interface 322 may include one or more of an InfiniBand host bus adapter, an Ethernet adapter, or a Bluetooth adapter for example.

Memory 302 may be configured to store a plurality of data buckets 304. Each of the plurality of data buckets 304 may be collected during a different replication period and contain information that is necessary to synchronize the states of volume 135 and volume copy 137 in order to account for any changes to volume 135 that occurred during the replication period.

The term "replication period" pertains to the time interval in which data is replicated. The replication period may have a fixed length that is set by a system administrator. Consider now an example in which the replication period of primary storage system 134 has a duration of 10 minutes. In this example, data is replicated from volume 135 (and/or other volumes or data storage objects in primary storage system 133) to secondary storage system 134 at the end of each 10-munute period. In each 10-munute period, a different data bucket 304 is created and populated with information. This activity is also referred to as "collecting the data bucket". Specifically, during each 10-minute period, manager 316 may monitor what new data is being written to storage system 134 and insert, in the period's corresponding data bucket 304, information that identifies the new data. At the end of the 10-munite period, the information may be retrieved from the period's corresponding data bucket 304 and used to identify the new data, after which the new data is transmitted to secondary storage system 134 and stored there.

The term "data bucket" may refer to one or more objects (or a portion of an object) that store metadata, book-keeping information, state information, and/or any other type of information that is needed by manager 316 to carry out asynchronous data replication of volume 135 (and/or any storage object in primary storage system 133). Under the nomenclature of the present disclosure, the actual data that is being replicated is referred to as "replication data". In general, a data bucket may contain information identifying the replication data, and it may be used to find out which data needs to be replicated (i.e., copied to secondary storage system 134). Under the nomenclature of the present disclosure "replication data" is said to be associated with a "data bucket" when the data bucket implicitly or explicitly identifies the replication data. In some implementations, replication data that is stored in different volumes (and/or other storage objects) may be identified by the same data bucket.

A non-limiting example is now provided in further detail of the difference between a "data bucket" and "replication data corresponding to the data bucket". For instance, if in a given replication period, new data is written to addresses $0A1, $1B1, and $2C2 of volume 135, the data bucket for the given replication period may include the string "0A1, 2B1, 2C2", and the replication data corresponding to the data bucket may include the actual data that is either: (i) stored in volume 135 at addresses 0A1, 2B1, and 2C2, or (ii) stored in cache in anticipation of being destaged to Processor 312 may be configured to execute a data protector 314, the asynchronous replication manager 316 (hereinafter "manager 316"), an intrusion detector 318 (hereinafter "detector 318"), a coordination module 319 (hereinafter "module 319"), and an auditing module 320 (hereinafter "module 320"). Each of data protector 314, manager 316, detector 318, module 319, and module 320 may be implemented in software, in hardware, or as a combination of software and hardware. The present disclosure is not limited to any specific implementation of data protector 314, manager 316, detector 318, module 319, and module 320.

Figure 4A:
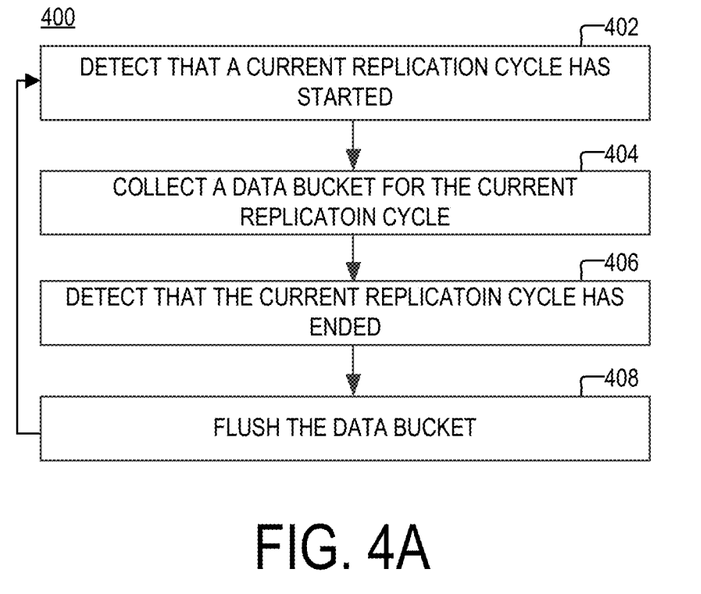
FIG. 4A is a flowchart of an example of a process, according to aspects of the disclosure.

Data protector 314 may include any suitable type of software that is configured to create snapshots of a volume and mirror images of the volume. In one example, the data protector 314 may be configured to execute a process 400, which is discussed further below with respect to FIG. 4. In one example, the data protector 314 may be configured to provide a granular level of protection for mainframe assets (or any other assets) so that a processing error, malicious intent, or human error may not cause a data center-wide outage or loss of data recovery capabilities. The data protector 314 uses the concept of snapshots of source volumes (such as volume 135) that allow applications to restore data at a more granular level. The granularity provides point-in-time recovery for both database and non-database systems. With point-in-time copies, selectable recovery points, and the ability to automate backup processes, users can elevate their data center and mission-critical data management to a high level.

Manager 316 may be configured to perform asynchronous replication of volume 135 to volume copy 137. The operation of manager 316 is discussed further below with respect to FIGS. 4A-B.

Detector 318 may include any suitable type of intrusion detector. According to the present example, detector 318 is a Cyber Intrusion Detection for z Systems (zCID), which is sold and marketed by the Dell Corporation of Round Rock, TX. However, the present disclosure is not limited to using any specific type of intrusion detector. As used herein, the term "intrusion" may refer to unauthorized access to a storage system or portion thereof, unauthorized access to data, the installation or execution of malware on a computing device, and/or any other suitable type of malicious or harmful activity.

Module 319 may be configured to coordinate the operation of manager 316 with the operation of detector 318. Module 319 may be configured to pause and terminate the operation of manager 316 based on events that are generated by detector 318 which indicate that detector 318 has detected an intrusion. In some implementations, module 319 may be configured to execute a process 500, which is discussed further below with respect to FIG. 5. Although, in the example of FIG. 3, module 319 is depicted as a separate entity, it will be understood that in many practical applications module 319 would be integrated as part of manager 316. Stated succinctly, the present disclosure is not limited to any specific implementation of module 319.

For ease of description, data protector 314, manager 316, detector 318, and module 319 are depicted as being executed by processor 312. However, it will be understood that any of data protector 314, manager 316, detector 318, and module 319 may include one or more processes that are executed in another computing device. For example, detector 318 may include a plurality of processes, wherein each process is executed on a different one of storage processors 202 and configured to detect intrusions in that storage processor in particular. As another example, detector 318 may include one or more processes that are executed on any of storage processors 202 that are configured to copy data from volume 135 to volume copy 137 and/or delete data from volume copy 137 when the same data has been deleted from volume 135. Additionally, detector 318 may include another process that is executed on management system 132 (or elsewhere) that is configured to generate the data buckets 304. Although, in the present example, data buckets 304 are stored in the memory of management system 132, the present disclosure is not limited to storing data buckets 304 at any specific storage location.

Module 320 may include a secondary intrusion detector and/or any other security auditing software, such as, such as Splunk TM or LogRhythm TM. Module 320 may be used to confirm, or expose as false, any initial determination of detector 318 that an intrusion has occurred in the primary storage system 133. To determine whether the initial finding of detector 318 was correct, module 320 may be configured to examine one or more system logs of primary storage system 133 and/or any other suitable type of record. For ease of description, module 320 is depicted as being executed by management system 132. However, it will be understood that module 320 may be executed on a different computing system. Furthermore, it will be understood that in some implementations, module 320 may be omitted. In such implementations, the confirmation of the initial finding of detector 318 may be carried out by a system administrator, either manually (or with the help of security auditing software).

FIG. 4A is a flowchart of an example of a process 400, according to aspects of the disclosure. At step 402, manager 316 detects that a current replication cycle has started. At step 404, manager 316 generates a data bucket for the current replication cycle. At step 406, manager 316 detects that the current replication cycle has ended. At step 408, manager 316 flushes the data bucket. Flushing the data bucket may include: (i) identifying, based on information that is part of the data bucket, data that is stored in volume 135 during the period in which the data bucket is collected, and (ii) transmitting the identified data to secondary storage system 134 where the identified data is stored in the volume copy 137. Additionally or alternatively, flushing the data bucket may include: (i) identifying, based on information that is part of the data bucket, data that is deleted from volume 135 during the period in which the data bucket is collected, and (ii) transmitting to secondary storage system 134 an instruction to delete that the same data from volume copy 137.

Process 400 is provided as an example only. At least some of the steps in process 400 may be performed in a different order, in parallel, or altogether omitted. For example, while a data bucket is being flushed, process 400 may be collecting a new data bucket for the next replication cycle. It would be provided that the present disclosure is not limited to any specific information being part of a data bucket and/or any specific implementation of the data buckets that are generated by manager 316, for as long as the data buckets identify implicitly or explicitly data that is stored in primary storage system 133 (in volume 135 or elsewhere) that needs to be replicated (e.g., copied) to secondary storage system 134. As can be readily appreciated, a data bucket may identify information that is no longer stored in primary storage system 133 (i.e., information that has been deleted), which also needs to be deleted from secondary storage system 134.

Figure 4B:
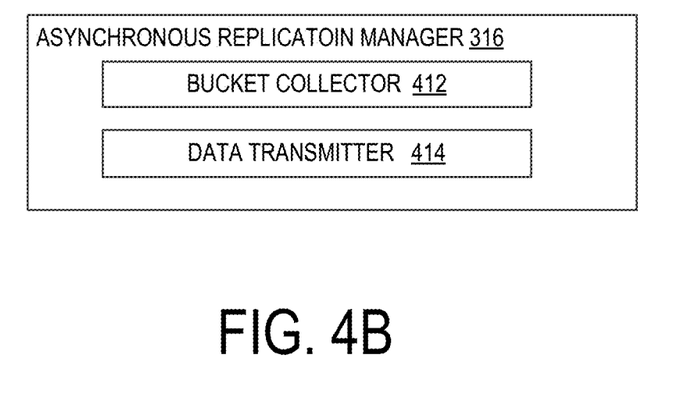
FIG. 4B is a diagram of an example of an asynchronous replication manager, according to aspects of the disclosure.

FIG. 4B is a diagram of an example of manager 316, according to one possible implementation. In the example of FIG. 4B, manager 316 includes a bucket collector 412 and a data transmitter 414. Bucket collector 412 may include one or more first processes that are configured to collect data buckets (e.g., by executing step 404). Data transmitter 414 may include one or more second processes that are configured to propagate modifications to volume 135 that are identified by the data buckets to volume copy 137 (e.g., by executing step 408). Specifically, data transmitter 414 may use the data buckets to identify any new data that has been written to volume 135, after which data transmitter 414 may transmit the identified data to secondary storage system 134 for storage in volume copy 137. In addition, as noted above, transmitter 414 may be configured to delete from volume copy 137 any data that is no longer stored in volume 135. FIG. 4B is provided as an example only. Although, in the example of FIG. 4B, the bucket collector 412 and data transmitter 414 are implemented using separate processes, in alternative implementations, bucket collector 412 and data transmitter 414 may be implemented by using the same process. Stated succinctly, the present disclosure is not limited to any specific implementation of manager 316.

Figure 5:
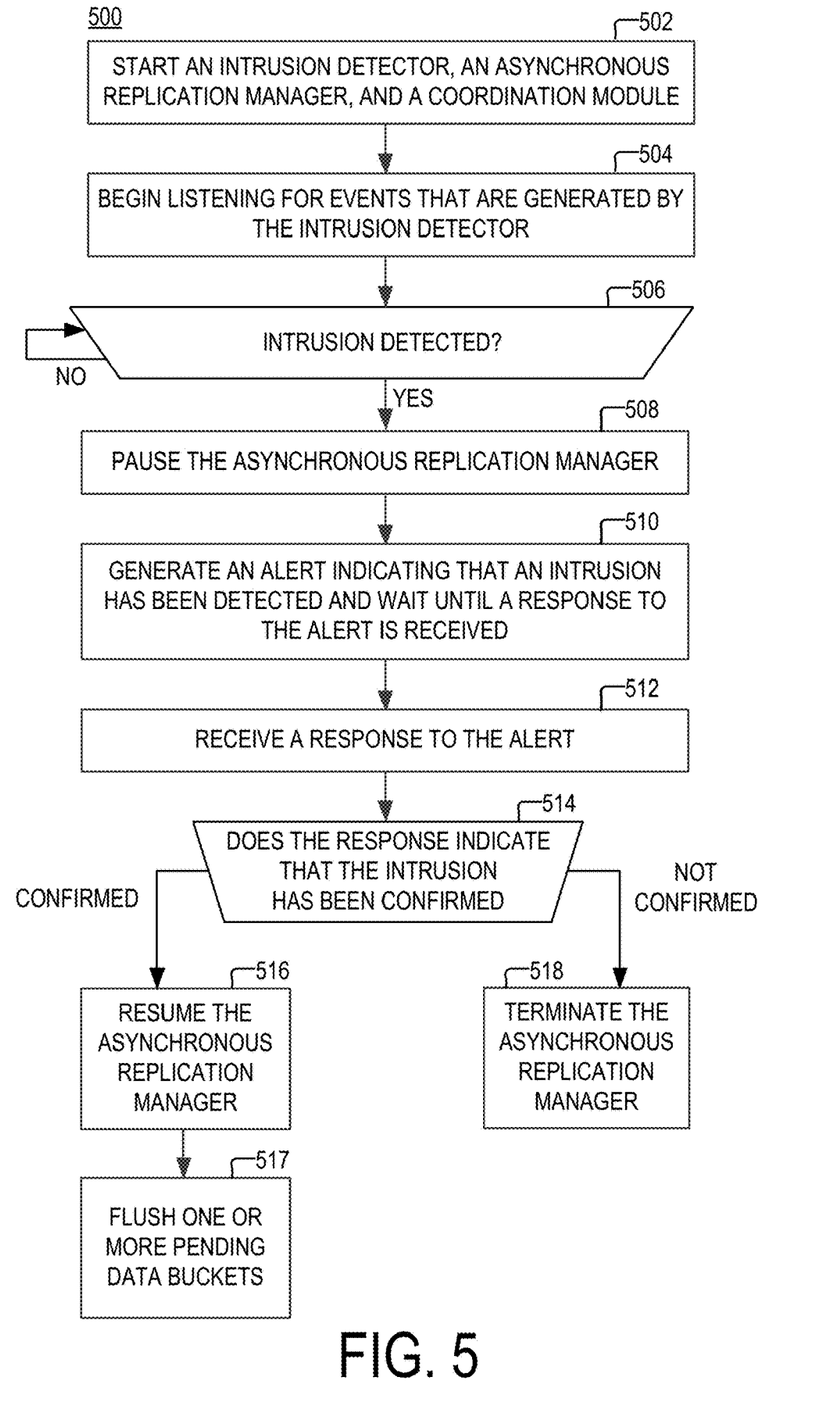
FIG. 5 is a flowchart of an example of a process, according to aspects of the disclosure.

FIG. 5 is a flowchart of an example of a process 500, according to aspects of the disclosure.

At step 502, manager 316, detector 318, and module 319 are started.

At step 504, module 319 begins listening for events that are generated by intrusion detector 318.

At step 506, module 319 detects whether an event has been generated by detector 318, which signals that an intrusion in primary storage system 133 has been detected by detected by detector 318. If such an event has been generated, process 500 proceeds to step 508. Otherwise, step 506 is executed again. For example, and without limitation, detecting the event may include receiving a message that is transmitted by detector 318, detecting that detector 318 has made a particular application programming interface (API) call, detecting that detector 318 has made a system call, detecting that the detector 318 has stored data at a predetermined memory location, or detecting that detector 318 has raised an interrupt. Stated succinctly, the present disclosure is not limited to any specific method for detecting that detector 316 has detected an intrusion.

At step 508, module 319 pauses manager 316. As used throughout the disclosure, the phrase "pausing the manager 316" shall refer to any action that causes manager 316 to stop transmitting replication data for volume 135 to the secondary storage system 134, and which does not stop completely (or interfere at all) with the collection of data buckets by manager 316. In other words, when manager 316 is paused: (1) manager 316 may stop transmitting replication data for volume 135 (or any volume or storage object in primary storage system 133) to secondary storage system 134, and (ii) manager 316 may continue collecting data buckets as it would when manager 316 is operating normally.

In some implementations, manager 316 may be paused by suspending one or more processes that are used to implement data transmitter 414 (shown in FIG. 4B). As can be readily appreciated, when a process is suspended, the process stops being executed or scheduled for execution, but its context is preserved. In other words, the memory allocated to the process remains allocated to it, and any data that is stored in this allocated memory is preserved. By contrast, when a process is killed, the memory allocated to the process is deallocated and the context information for the process is not preserved.

At step 510, module 319 generates (and/or transmits) an alert indicating that an intrusion has been detected. Generating the alert may include, raising an interrupt, transmitting a message, and/or any other suitable type of action. In one example, generating the alert may include transmitting a notification of the intrusion to a system administrator. In another example, generating the alert may include transmitting a message to module 320. In either case, the message may include any suitable information that is part of the event (detected at step 506). Additionally or alternatively, the message may include any information about the intrusion that is provided by detector 318. For example, the message may include an indication of the time when the intrusion is detected, identification of an intrusion type (e.g., ransomware detected, virus detected, unusual access pattern, etc.), and identification of one or more storage processors 202 that are deemed infected by the detector 318. The present disclosure is not limited to any specific format for the alert.

At step 512, module 319 receives a response to the alert (generated at step 510). The response may indicate whether the intrusion (detected at step 506) is confirmed or not confirmed. In one example, the response may have either a first value or a second value. When the response has the first value, this may mean that the intrusion has been confirmed. When the response has the second value, this may mean that the intrusion has not been confirmed (i.e., the second value may indicate that the event detected at step 506 was found to be a false positive).

In one example, receiving the response may include receiving user input (e.g., mouse or keyboard) that is entered by a system administrator. The user input may indicate that the system administrator has reviewed and analyzed the alert, various system logs, and/or any other information that is relevant to the intrusion (detected at step 506). The user input may indicate that the intrusion is either confirmed or not confirmed by the system administrator.

In another example, receiving the response may include receiving a message from a terminal that is used by the system administrator. The message may be received at management system 132 over communications network 120. The message may be generated in response to user input that is entered at the terminal from the system administrator. The message may indicate that the system administrator has reviewed and analyzed the alert, various system logs, and/or any other information that is relevant to the intrusion (detected at step 506). The message may indicate that the intrusion is either confirmed or not confirmed by the system administrator.

In yet another example, receiving the response may include receiving a message from a secondary intrusion detector (such as module 320). The message may be generated automatically. The message may indicate that the secondary intrusion detector has reviewed and analyzed the alert, various system logs, and/or any other information that is relevant to the intrusion (detected at step 506). The message may indicate that the intrusion is either confirmed or not confirmed by the secondary intrusion detector. In one example, to confirm the initial determination of intrusion that is made by detector 318, the secondary intrusion detector may perform a new scan of primary storage system 134 or perform a limited scan of storage system 134. The limited scan may involve scanning only storage processors that are identified in the alert and/or scanning only for the type of intrusion that is identified in the alert.

At step 514, module 319 processes the response (received at step 512) to determine whether the intrusion has been confirmed or not. Specifically, based on the contents of the received response, module 319 determines if the initial determination of detector 318 that an intrusion has occurred in storage system 133 has been confirmed by a system administrator and/or automated software. If the intrusion is confirmed, process 500 proceeds to step 516. Otherwise, if the intrusion is not confirmed, process 500 proceeds to step 518.

At step 516, module 319 resumes manager 316. Resuming manager 316 may include taking any action that causes manager 316 to resume transmitting replication data to the secondary storage system 134. In one example, resuming manager 316 may include transitioning the one or more processes used to implement data transmitter 414 (shown in FIG. 4B) from the suspended state to the active state. By way of example, when manager 316 is operating normally, manager 316 may execute (in a loop) each of steps 402-408 of process 400. When manager 316 is paused, manager 316 may execute (in a loop) steps 402-406, while abstaining from executing step 408.

At step 517, manager 316 flushes any pending data buckets that are stored in memory 302. In one example, each data bucket that is stored in memory 302, and has not been flushed yet, may be flushed by manager 316. Alternatively, in some implementations, only the most recent data bucket that is stored in memory 302 (or fewer than all data buckets) may be flushed. Flushing any of the data buckets may include: (i) identifying, based on information that is part of the data bucket, data that is stored in primary storage system 133 (and/or volume 135) during the period in which the data bucket is collected, and (ii) transmitting the identified data to secondary storage system 134 where the identified data is stored. Additionally or alternatively, flushing any of the data buckets may include: (i) identifying, based on information that is part of the data bucket, data that is deleted from primary storage system 133 (and/or volume 135) during the period in which the data bucket is collected, and (ii) transmitting to secondary storage system 134 an instruction to delete that the same data from secondary storage system 134 (and/or volume copy 137).

At step 518, module 319 terminates manager 316. Terminating manager 316 may include taking any action that would cause manager 316 to stop collecting data buckets. In other words, when manager 316 is terminated: (1) manager 316 may not transmit replication data for volume 135 (or any volume or storage object in primary storage system 133) to secondary storage system 134, and (ii) manager 316 may stop collecting data buckets. In one example, terminating manager 316 may include killing (or suspending) one or more processes that are used to implement bucket collector 412 (shown in FIG. 4B). Additionally or alternatively, terminating manager 316 may include killing all processes that are used to implement data transmitter 414 (shown in FIG. 4B). Additionally or alternatively, terminating manager 316 may include killing all processes that are used to implement manager 316 and/or otherwise seizing the execution of manager 316. In one example, when manager 316 is terminated, none of the steps in process 400 may be performed.

Although in the example of FIGS. 1-5 only volume 135 is replicated, it will be understood that in alternative implementations an entire storage group is replicated. The storage group may include a plurality of data volumes (or other storage objects). Stated succinctly, the present disclosure is not limited to any specific body of data being replicated by manager 316 with each data bucket.

Process 500 presents a two-stage approach for responding to the detection of an intrusion by detector 318. In the first stage, the transmission of replication data is suspended, while the collection of data buckets is permitted to proceed unhindered. After the transmission of replication data is suspended, manager 316 begins waiting for confirmation that the intrusion detector 318 was correct in calling out the intrusion. The confirmation may be obtained by way of a system administrator examining various system logs and other information to assess whether the intrusion detector 318 was correct in determining that an intrusion has taken place. The system administrator may provide, to manager 316, user input that is indicative of the conclusion reached by the system administrator. The user input may indicate that detector 318 was correct in signaling an intrusion. Or alternatively, the user input may indicate that the alarm raised by detector 318 was a false positive.

If the initial determination is not confirmed (i.e., if it was a false positive), the transmission of replication data to secondary storage system 134 is resumed. Depending on how primary storage system 133 is implemented, the resumption of replication data transmission may be performed in one of at least two different ways. For example, when the transmission of replication data is resumed, all pending data buckets in the memory of management system 132 may be flushed. In another example, when the transmission of replication data is resumed, only the last one of the pending data buckets may be flushed (or fewer than all pending data are flushed).

The second stage is executed only if the initial determination of detector 318 that an intrusion has occurred is confirmed (i.e., if the event detected at step 506 is found to be correct). In the second stage, the collection of data buckets is also stopped. In the present example, the execution of manager 316 is terminated altogether. However, the present disclosure is not limited to any specific method for stopping the collection of data buckets.

Terminating the execution of manager 316 in the second stage is advantageous because it avoids the negative effects associated with false positives. The negative effects are avoided by allowing manager 316 to continue running (and suspending only the transmission of data) until the initial determination of intrusion detector 318 is confirmed. This allows the full operation of manager 316 to be resumed in a fast and efficient manner should the alert raised by intrusion detector 318 be found to be a false positive. Also, the two-step approach allows for making intrusion detectors more sensitive, with the understanding that this might result in a higher rate of false positives.

More particularly, if the execution of manager 316 were to be terminated at the first stage, rather than the second stage, it would take much longer to restart the operation of manager 316 every time detector 318 generates a false positive. This is because starting manager 316 may involve first synchronizing the states of primary storage system 133 (and/or volume 135) and secondary storage system 134 (and/or volume copy 137), as well as making other time-consuming system calls. In general, storage systems such as primary storage system 133 and secondary storage system 134 may be very large in scale (e.g., containing tens and hundreds of storage processors and storing vast amounts of user data), which in turn could make a cold start of manager 316 time-consuming and inefficient. In this regard, the two-stage approach, an example of which is provided with respect to FIG. 5, constitutes a more graceful and robust way of handling the possibility that some of the alerts raised by intrusion detector 318 might turn out to be false positives.

Moreover, the process of FIG. 5 is advantageous because it enables any alerts that are raised by detector 318 to be addressed immediately (or quickly), which ideally would prevent the spread of potentially infected data to secondary storage system 134. The secondary storage system 134 may be used to fall back on, or re-sync the primary storage system 134 with "good" data, should the primary storage system 133 experience data corruption. If bad (e.g., corrupted or infected, etc.) data reaches the secondary storage system 134, one would need to perform a recovery procedure on the secondary storage system 134 with a local point-in-time copy where the data was not corrupted. This can be a lengthy process to complete. By catching intrusions and limiting the amount of bad data to reach the secondary storage system 134, the process of FIG. 5. can potentially speed up the recovery process on the secondary storage system 134 or altogether avoid the need for such a recovery.

Figure 6:
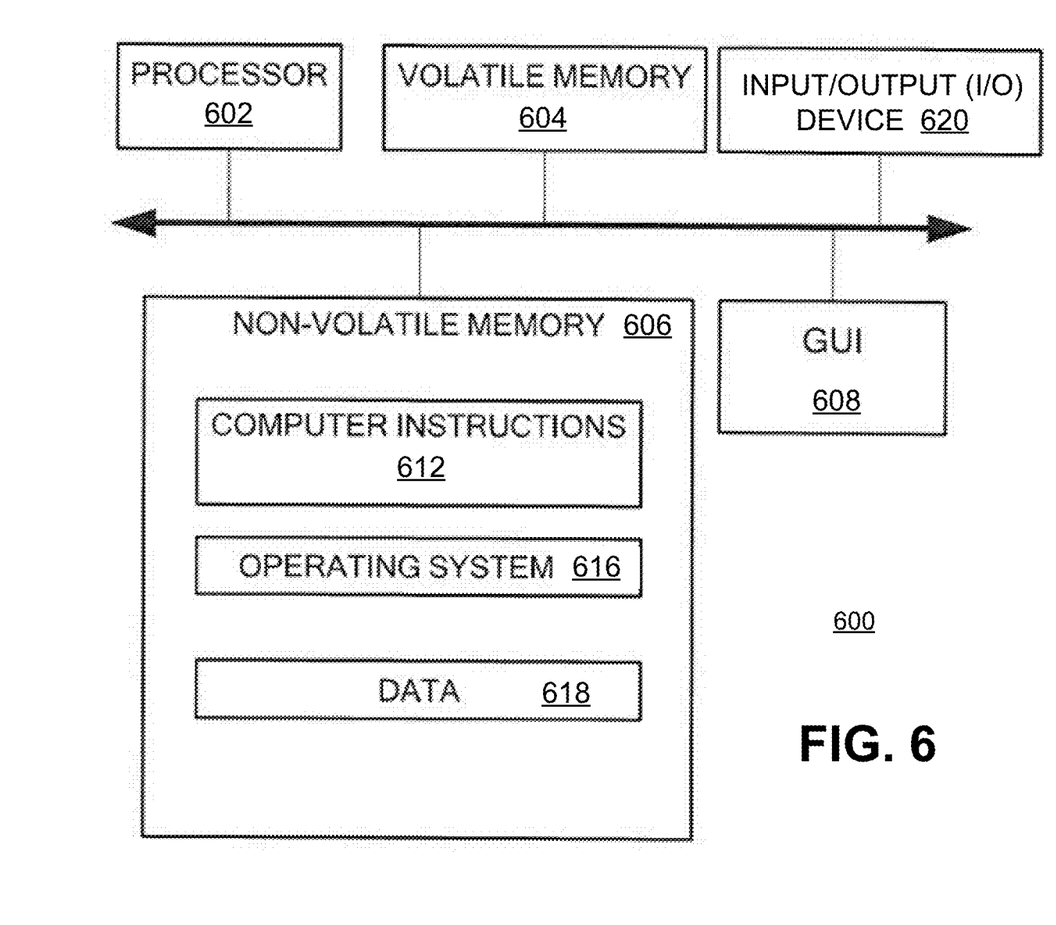
FIG. 6 is a diagram of an example of a computing device, according to aspects of the disclosure.

Referring to FIG. 6, in some embodiments, a device 600 may include processor 602, volatile memory 604 (e.g., RAM), non-volatile memory 606 (e.g., a hard disk drive, a solid-state drive such as a flash drive, a hybrid magnetic and solid-state drive, etc.), graphical user interface (GUI) 608 (e.g., a touchscreen, a display, and so forth) and input/output (I/O) device 620 (e.g., a mouse, a keyboard, etc.). Non-volatile memory 606 stores computer instructions 612, an operating system 616 and data 618 such that, for example, the computer instructions 612 are executed by the processor 602 out of volatile memory 604. Program code may be applied to data entered using an input device of GUI 608 or received from I/O device 620.

FIGS. 1-6 are provided as an example only. In some embodiments, the term "I/O request" or simply "I/O" may be used to refer to an input or output request. At least some of the steps discussed with respect to FIGS. 1-6 may be performed in a different order or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments. (1/23)

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a storage system including a primary storage system and a secondary storage system, the method comprising:
    starting an asynchronous replication manager, the asynchronous replication manager being configured to replicate data from the primary storage system to the secondary storage system at predetermined time intervals, wherein replicating the data includes collecting a data bucket for each of the predetermined time intervals and transmitting replication data associated with each data bucket from the primary storage system to the secondary storage system;
    detecting that an intrusion detector has detected an intrusion in the primary storage system;
    in response to the intrusion being detected, causing the asynchronous replication manager to stop transmission, to the secondary storage system, of replication data associated with any data buckets that are collected by the asynchronous replication manager while allowing the asynchronous replication manager to continue collecting new data buckets;
    generating an alert that indicates that the intrusion detector has detected the intrusion;
    receiving a response that is indicative of whether the intrusion is confirmed;
    when the response indicates that the intrusion is not confirmed, resuming the asynchronous replication manager, wherein resuming the asynchronous replication manager includes causing the asynchronous replication manager to resume the transmission of replication data that is associated with any data buckets that are collected by the asynchronous replication manager; and
    when the response indicates that the intrusion is confirmed, causing the asynchronous replication manager to stop collecting data buckets.

2. The method of claim 1, wherein causing the asynchronous replication manager to stop the transmission of replication data while allowing the asynchronous replication manager to continue collecting new data buckets includes pausing the asynchronous replication manager.

3. The method of claim 1, wherein causing the asynchronous replication manager to stop collecting data buckets includes terminating the asynchronous replication manager.

4. The method of claim 1, wherein the data bucket for any of the predetermined time intervals includes one or more data items that identify one or more addresses in the primary storage system that are required to be replicated to the secondary storage system.

5. The method of claim 1, wherein the response is generated based on user input.

6. The method of claim 1, wherein the response is generated by an auditing module of the primary storage system.

7. The method of claim 1, wherein the response indicates that the intrusion is confirmed when the response has a first value and the response indicates that the intrusion is not confirmed when the response has a second value.

8. A system comprising:
    a memory; and
    a processor that is operatively coupled to the memory, the processor being configured to perform the operations of:
    starting an asynchronous replication manager, the asynchronous replication manager being configured to replicate data from a primary storage system to a secondary storage system at predetermined time intervals, wherein replicating the data includes collecting a data bucket for each of the predetermined time intervals and transmitting replication data associated with each data bucket from the primary storage system to the secondary storage system;
    detecting that an intrusion detector has detected an intrusion in the primary storage system;
    in response to the intrusion being detected, causing the asynchronous replication manager to stop transmission, to the secondary storage system, of replication data associated with any data buckets that are collected by the asynchronous replication manager while allowing the asynchronous replication manager to continue collecting new data buckets;
    generating an alert that indicates that the intrusion detector has detected the intrusion;
    receiving a response that is indicative of whether the intrusion is confirmed;
    when the response indicates that the intrusion is not confirmed, resuming the asynchronous replication manager, wherein resuming the asynchronous replication manager includes causing the asynchronous replication manager to resume the transmission of replication data that is associated with any data buckets that are collected by the asynchronous replication manager; and
    when the response indicates that the intrusion is confirmed, causing the asynchronous replication manager to stop collecting data buckets.

9. The system of claim 8, wherein causing the asynchronous replication manager to stop the transmission of replication data while allowing the asynchronous replication manager to continue collecting new data buckets includes pausing the asynchronous replication manager.

10. The system of claim 8, wherein causing the asynchronous replication manager to stop collecting data buckets includes terminating the asynchronous replication manager.

11. The system of claim 8, wherein the data bucket for any of the predetermined time intervals includes one or more data items that identify one or more addresses in the primary storage system that are required to be replicated to the secondary storage system.

12. The system of claim 8, wherein the response is generated based on user input.

13. The system of claim 8, wherein the response is generated by an auditing module of the primary storage system.

14. The system of claim 8, wherein the response indicates that the intrusion is confirmed when the response has a first value and the response indicates that the intrusion is not confirmed when the response has a second value.

15. A non-transitory computer-readable medium storing one or more processor-executable instructions which, when executed by at least one processor of a primary storage system, causes the at least one processor to perform the operations of:
  starting an asynchronous replication manager, the asynchronous replication manager being configured to replicate data from the primary storage system to a secondary storage system at predetermined time intervals, wherein replicating the data includes collecting a data bucket for each of the predetermined time intervals and transmitting replication data associated with each data bucket from the primary storage system to the secondary storage system;
  detecting that an intrusion detector has detected an intrusion in the primary storage system;
  in response to the intrusion being detected, causing the asynchronous replication manager to stop transmission, to the secondary storage system, of replication data associated with any data buckets that are collected by the asynchronous replication manager while allowing the asynchronous replication manager to continue collecting new data buckets;
  generating an alert that indicates that the intrusion detector has detected the intrusion;
  receiving a response that is indicative of whether the intrusion is confirmed;
  when the response indicates that the intrusion is not confirmed, resuming the asynchronous replication manager, wherein resuming the asynchronous replication manager includes causing the asynchronous replication manager to resume the transmission of replication data that is associated with any data buckets that are collected by the asynchronous replication manager; and
  when the response indicates that the intrusion is confirmed, causing the asynchronous replication manager to stop collecting data buckets.

16. The non-transitory computer-readable medium of claim 15, wherein causing the asynchronous replication manager to stop the transmission of replication data while allowing the asynchronous replication manager to continue collecting new data buckets includes pausing the asynchronous replication manager.

17. The non-transitory computer-readable medium of claim 15, wherein causing the asynchronous replication manager to stop collecting data buckets includes terminating the asynchronous replication manager.

18. The non-transitory computer-readable medium of claim 15, wherein the data bucket for any of the predetermined time intervals includes one or more data items that identify one or more addresses in the primary storage system that are required to be replicated to the secondary storage system.

19. The non-transitory computer-readable medium of claim 15, wherein the response is generated based on user input.

20. The non-transitory computer-readable medium of claim 15, wherein the response is generated by an auditing module of the primary storage system.

* * * * *